(12) United States Patent
Tamoto et al.

(10) Patent No.: US 11,084,399 B2
(45) Date of Patent: Aug. 10, 2021

(54) VEHICLE CONTROL APPARATUS

(71) Applicant: SUBARU CORPORATION, Tokyo (JP)

(72) Inventors: Fumihiko Tamoto, Tokyo (JP); Masayoshi Nishimura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 416 days.

(21) Appl. No.: 16/176,796

(22) Filed: Oct. 31, 2018

(65) Prior Publication Data
US 2019/0193575 A1    Jun. 27, 2019

(30) Foreign Application Priority Data

Dec. 25, 2017   (JP) .............................. JP2017-248482

(51) Int. Cl.
*B60W 20/00*   (2016.01)
*B60L 58/26*   (2019.01)
*B60W 20/50*   (2016.01)
*H01M 10/625*  (2014.01)
(Continued)

(52) U.S. Cl.
CPC ............. *B60L 58/26* (2019.02); *B60W 20/50* (2013.01); *B60L 2240/545* (2013.01); *H01M 10/486* (2013.01); *H01M 10/613* (2015.04); *H01M 10/625* (2015.04)

(58) Field of Classification Search
CPC .............................. B60W 20/50; B60W 10/30
See application file for complete search history.

(56) References Cited

U.S. PATENT DOCUMENTS

2008/0253429 A1   10/2008   Choi et al.
2009/0093929 A1   4/2009    Weissert et al.
(Continued)

FOREIGN PATENT DOCUMENTS

JP   2000-227150 A   8/2000
JP   2004-320881 A   11/2004
(Continued)

OTHER PUBLICATIONS

Japanese Notice of Reasons for Refusal issued in corresponding Japanese Patent Application No. 2017-248482, dated Oct. 23, 2019, with English translation.

*Primary Examiner* — Truc M Do
(74) *Attorney, Agent, or Firm* — McDermott Will & Emery LLP

(57) ABSTRACT

A vehicle control apparatus includes: an oil temperature sensor in the oil; a motor temperature sensor at a position higher than that of an oil level of the oil; a common temperature sensor disposed at a position in the oil when a driving state of the vehicle is a first driving state and disposed at a position higher than that of the oil level when the driving state of the vehicle is a second driving state; a state determination unit configured to determine whether the driving state of the vehicle is either one of the first and second driving states, on the basis of at least a revolution number of the motor; and a malfunction diagnosis unit configured to perform malfunction diagnosis on the basis of output from the common temperature sensor in the first driving state and output from the common temperature sensor in the second driving state.

7 Claims, 5 Drawing Sheets

(51) Int. Cl.
　　　*H01M 10/613* 　　(2014.01)
　　　*H01M 10/48* 　　(2006.01)

(56) References Cited

U.S. PATENT DOCUMENTS

| | | | |
|---|---|---|---|
| 2013/0275016 A1* | 10/2013 | Mitani | F16H 61/12 |
| | | | 701/62 |
| 2014/0191696 A1 | 7/2014 | Hattori | |
| 2016/0001773 A1* | 1/2016 | Kang | B60W 10/08 |
| | | | 701/22 |

FOREIGN PATENT DOCUMENTS

| | | |
|---|---|---|
| JP | 2007-247706 A | 9/2007 |
| JP | 2009-090751 A | 4/2009 |
| JP | 2013-031282 A | 2/2013 |
| JP | 2015-119543 A | 6/2015 |
| JP | 2017-050909 A | 3/2017 |

\* cited by examiner

VEHICLE CONTROL APPARATUS

CROSS-REFERENCE TO RELATED APPLICATIONS

The present application claims priority from Japanese Patent Application No. 2017-248482 filed on Dec. 25, 2017, the entire contents of which are hereby incorporated by reference.

BACKGROUND

The technology relates to a vehicle control apparatus that is configured to cool a motor mounted on a vehicle.

A motor temperature sensor is provided to a motor that is mounted on a vehicle such as a hybrid electric automobile or an electric automobile. Such a motor temperature sensor is disclosed in, for example, Japanese Unexamined Patent Application Publication (JP-A) No. 2000-227150. In these conditions, an oil temperature sensor is provided to an oil pan.

SUMMARY

An aspect of the technology provides a vehicle control apparatus configured to control a vehicle provided with a motor and oil. The vehicle control apparatus includes an oil temperature sensor, a motor temperature sensor, a common temperature sensor, a state determination unit, and a malfunction diagnosis unit. The oil temperature sensor is disposed in the oil. The motor temperature sensor is provided to the motor and is disposed at a position that is higher than a position of an oil level of the oil. The common temperature sensor is provided to the motor. The common temperature sensor is disposed at a position that is in the oil when a driving state of the vehicle is a first driving state and is disposed at a position that is higher than the position of the oil level when the driving state of the vehicle is a second driving state. The state determination unit is configured to determine whether the driving state of the vehicle is either one of the first driving state and the second driving state, on the basis of at least a revolution number of the motor. The malfunction diagnosis unit is configured to perform malfunction diagnosis of the oil temperature sensor and the motor temperature sensor on the basis of output from the common temperature sensor in the first driving state and output from the common temperature sensor in the second driving state.

An aspect of the technology provides a vehicle control apparatus configured to control a vehicle provided with a motor and oil. The vehicle control apparatus includes an oil temperature sensor, a motor temperature sensor, a common temperature sensor, and circuitry. The oil temperature sensor is disposed in the oil. The motor temperature sensor is provided to the motor and is disposed at a position that is higher than a position of an oil level of the oil. The common temperature sensor is provided to the motor. The common temperature sensor is disposed at a position that is in the oil when a driving state of the vehicle is a first driving state and is disposed at a position that is higher than the position of the oil level when the driving state of the vehicle is a second driving state. The circuitry is configured to determine whether the driving state of the vehicle is either one of the first driving state and the second driving state, on the basis of at least a revolution number of the motor, and perform malfunction diagnosis of the oil temperature sensor and the motor temperature sensor on the basis of output from the common temperature sensor in the first driving state and output from the common temperature sensor in the second driving state.

DETAILED DESCRIPTION

Figure 1:
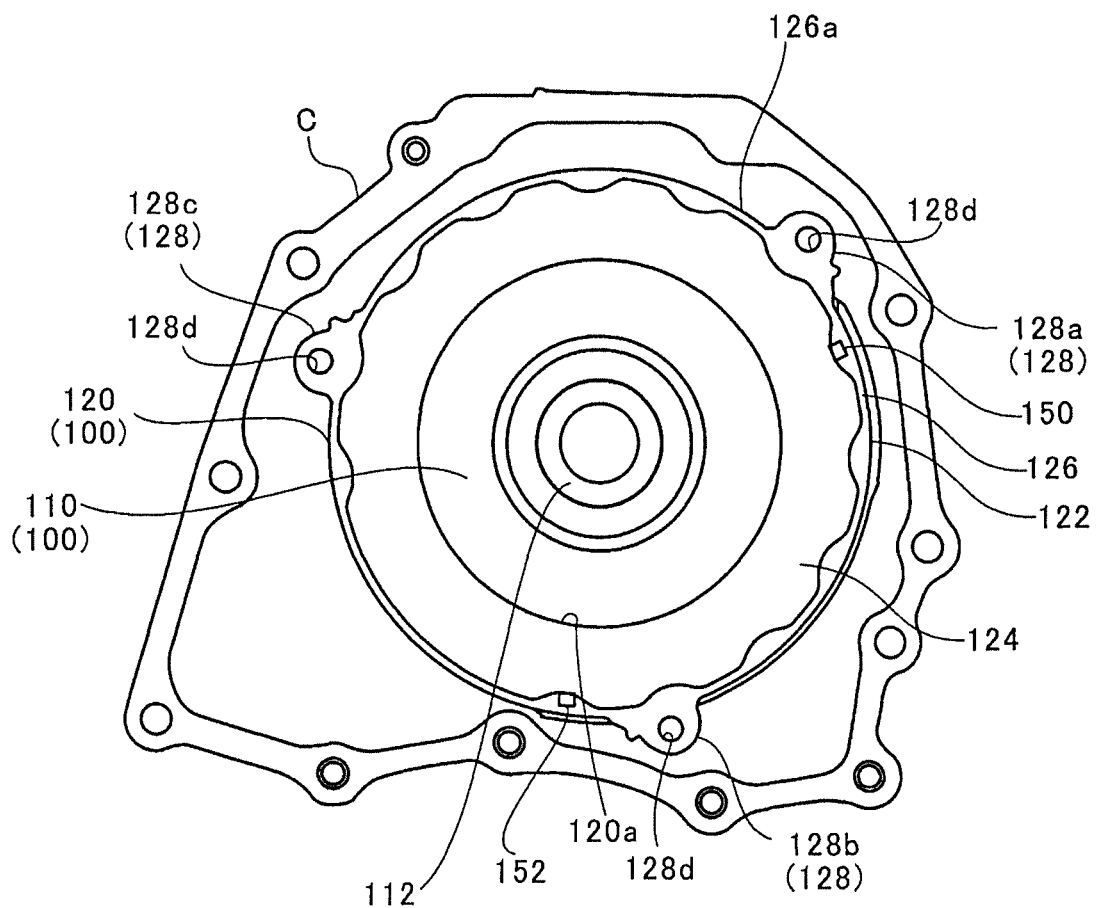
FIG. 1 is a schematic diagram illustrating an example of a motor as viewed from a direction of a rotation shaft of a rotor.

In the following, a description is given of an example implementation of the technology with reference to the accompanying drawings. Note that the following description is directed to illustrative examples of the technology and not to be construed as limiting to the technology unless it is noted otherwise. Factors including, without limitation, numerical values, dimensions, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Note that elements having substantially the same functions and components are represented by the same reference signs in the following description and the drawings, and descriptions thereof are not repeated. In addition, elements that are unrelated to the implementation of the technology are omitted in the drawings.

JP-A No. 2000-227150 discloses a separate temperature sensor directed to malfunction diagnosis. This separate temperature sensor is provided to a motor temperature sensor. In a case where the separate temperature sensor directed to malfunction diagnosis is also provided to an oil temperature sensor, four temperature sensors are required in total. As a result, the cost of temperature sensors directed to malfunction diagnosis is increased.

In view of this, it is desirable to provide a vehicle control apparatus that performs malfunction diagnosis of each of a motor temperature sensor and an oil temperature sensor, while suppressing cost.

FIG. 1 is a schematic diagram illustrating a motor 100 as viewed from a direction of a rotation shaft of a rotor 110. The direction of the rotation shaft of the rotor 110 may be in an X-axis direction in FIG. 1. The direction of the rotation shaft of the rotor 110 may be simply called a "shaft direction" hereinafter. The motor 100 may be mounted on a vehicle such as a hybrid electric automobile or an electric automobile. The motor 100 may include the rotor 110 and a stator 120.

The rotor 110 may include a permanent magnet and may be rotatably inserted into a center hole 120*a* via a shaft 112. The center hole 120*a* may be provided to the stator 120. For example, the rotor 110 may be fixed to the shaft 112 while an outer circumferential surface of the rotor 110 is separated away from an inner circumferential surface of the stator 120. The shaft 112 may be rotatably supported by a case C via a bearing, which is not illustrated in the drawing. That is, the rotor 110 may be rotatably supported by the case C.

The stator 120 may include a stator core 122 and a coil 124. The stator core 122 may have a cylindrical body 126. On the inner side of the body 126 in a radial direction of the body 126, multiple winding parts may be provided. The multiple winding parts are not illustrated in the drawing. The multiple winding parts may be wound with wire to provide the coil 124. Each end of the coil 124 in the shaft direction, which is the X-axis direction in FIG. 1, may be sealed by a molded part that includes an insulator such as resin.

A protrusion 128 may be provided on an outer circumferential surface 126*a* of the body 126. The protrusion 128 may outwardly protrude in the radial direction while extending in the shaft direction, which is the X-axis direction in FIG. 1. In an example implementation of the technology, multiple protrusions 128 may be provided at respective multiple positions that are separated away from each other with predetermined distances in between in the circumferential direction of the body 126. In one example, three protrusions 128 may be provided to respective three positions. Hereinafter, among the three protrusions 128, the protrusion 128 at a vertically uppermost position may be called a "first protrusion 128*a*", the protrusion 128 at a vertically lowermost position may be called a "second protrusion 128*b*", and the protrusion 128 that is positioned between the first protrusion 128*a* and the second protrusion 128*b* may be called a "third protrusion 128*c*".

Each of the protrusions 128 may be provided with a through hole 128*d* that passes therethrough in the shaft direction. A fixing member, such as a bolt, may be inserted into the through hole 128*d* to fix the stator 120 to the case C via the fixing member. The fixing member is not illustrated in the drawing. Thus, the case C may enclose the outer circumferential surface 126*a* of the stator 120 with a predetermined space.

The coil 124 in the vicinity of the first protrusion 128*a* may be provided with a motor temperature sensor 150. The motor temperature sensor 150 may be disposed at a position that is lower than that of the first protrusion 128*a* in the vertical direction, which is an up-down direction in FIG. 1. The motor temperature sensor 150 may detect the temperature of the motor 100 or the coil 124.

The coil 124 in the vicinity of the second protrusion 128*b* may be provided with a common temperature sensor 152. The common temperature sensor 152 may be disposed at a position that is approximately the same as that of the second protrusion 128*b* in the vertical direction. The common temperature sensor 152 may be disposed, for example, at a lowermost position of the coil 124 in the vertical direction. Detection objects of which temperatures are to be detected by the common temperature sensor 152 may be different depending on the position of the oil level of the oil. Details of the position of the oil level of the oil will be described later. Also, details of the common temperature sensor 152 will be described later.

Figure 2:
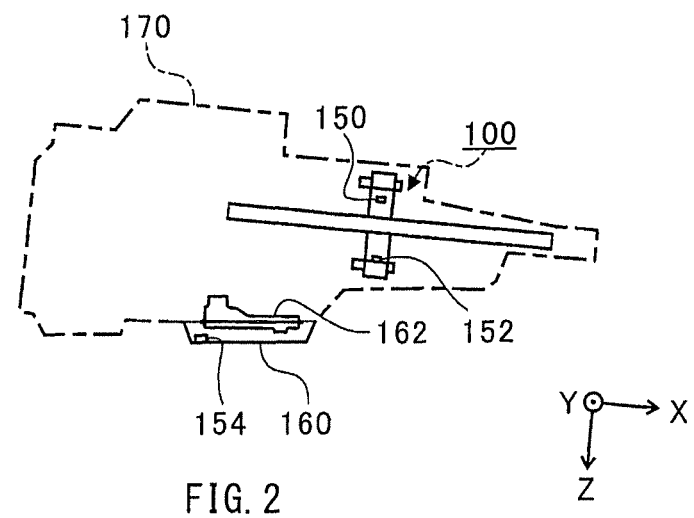
FIG. 2 is a diagram for explaining an example of a position relationship between the motor and an oil pan.

FIG. 2 is a diagram for explaining a position relationship between the motor 100 and an oil pan 160. FIG. 2 illustrates the motor 100 as viewed from a side. FIG. 2 illustrates an outer shape of a transmission 170 by using an alternate long and short dash line without illustrating an inside structure of the transmission 170. FIG. 2 illustrates part of the motor 100. An up-down direction in FIG. 2 may be the vertical direction.

The motor 100 may be disposed in the condition in which the shaft direction tilts clockwise from a horizontal direction by a predetermined tilt angle. The horizontal direction may be a left-right direction in FIG. 2. The predetermined tilt angle may be, for example, approximately 5.7 degrees. The motor temperature sensor 150 may be disposed at a position that is higher than that of the common temperature sensor 152 in the vertical direction. The oil pan 160 may be disposed at a position that is lower than that of the motor 100 in the vertical direction.

The oil pan 160 may be disposed at a position that is lower than that of the transmission 170 in the vertical direction. The oil pan 160 may store the oil. The oil that is stored in the oil pan 160 may be suctioned by an oil pump via a strainer 162. The oil pump is not illustrated in the drawing. The suctioned oil may be supplied to oil hydraulic circuits, such as the transmission 170 and a torque converter, as well as to lubricating circuits, such as a chain belt, a sprocket, and a bearing.

An oil temperature sensor 154 may be disposed inside the oil pan 160. The oil temperature sensor 154 may be disposed in the oil when the oil is stored in the oil pan 160. In other words, the oil temperature sensor 154 may be disposed at a position lower than that of the oil level F of the oil when the oil is stored in the oil pan 160. The oil temperature sensor 154 may be disposed at a position that is lower than those of both of the motor temperature sensor 150 and the common temperature sensor 152 in the vertical direction. The oil temperature sensor 154 may detect the temperature of the oil stored in the oil pan 160. That is, the oil temperature sensor 154 may be an automatic transmission fluid (ATF) temperature sensor.

Figure 3:
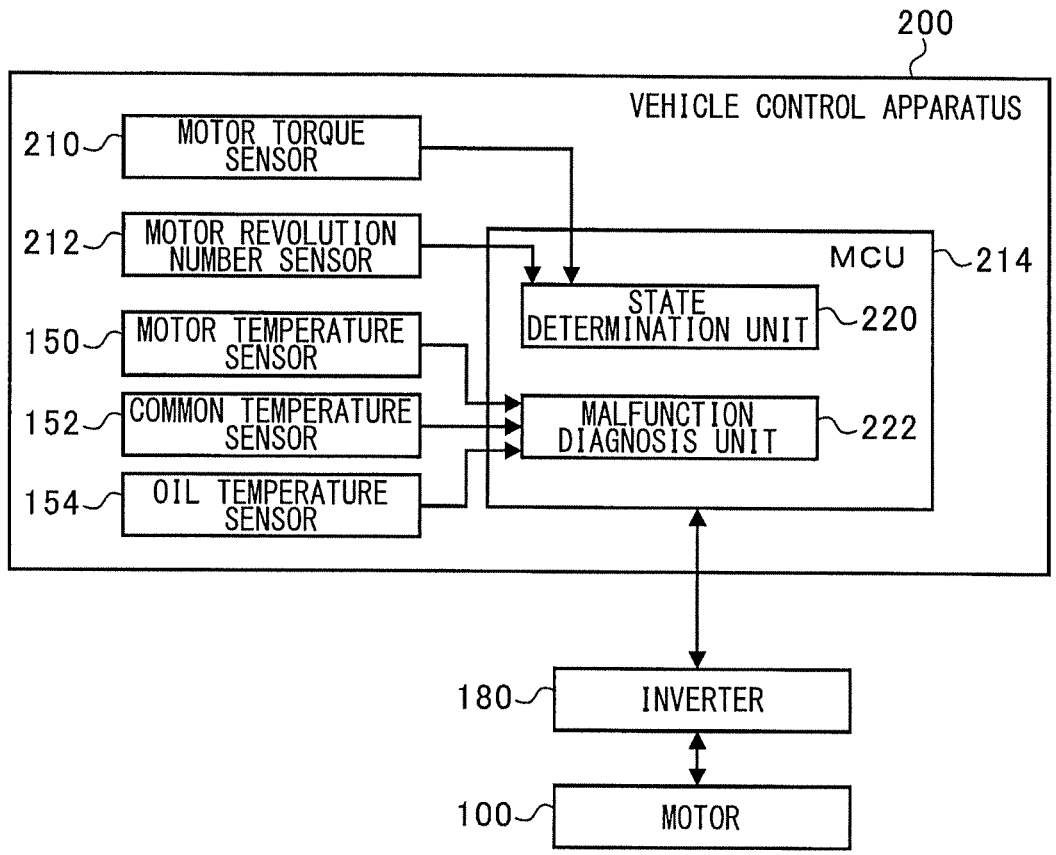
FIG. 3 is a block diagram for explaining an example of functions of a vehicle control apparatus.

FIG. 3 is a block diagram for explaining functions of a vehicle control apparatus 200. The vehicle control apparatus 200 may control a vehicle that is provided with the motor 100 and the oil. For example, as illustrated in FIG. 3, the vehicle control apparatus 200 may include a motor torque sensor 210, a motor revolution number sensor 212, and a motor control unit (MCU) 214. The vehicle control apparatus 200 may also include the motor temperature sensor 150, the common temperature sensor 152, and the oil temperature sensor 154.

The motor torque sensor 210 may detect the torque of the motor 100. The torque of the motor 100 may be called "motor torque" hereinafter. The motor revolution number sensor 212 may detect the revolution number of the motor 100. The revolution number of the motor 100 may be called "motor revolution number" hereinafter.

The MCU 214 may include a semiconductor integrated circuit and may control driving of the motor 100 via an inverter 180. The semiconductor integrated circuit may include a central processing unit (CPU), a read-only memory (ROM), a random-access memory (RAM), and any other component. The ROM may store programs or any other information. The RAM may serve as a work region. The MCU 214 may also serve as a state determination unit 220 and a malfunction diagnosis unit 222.

Figure 4:
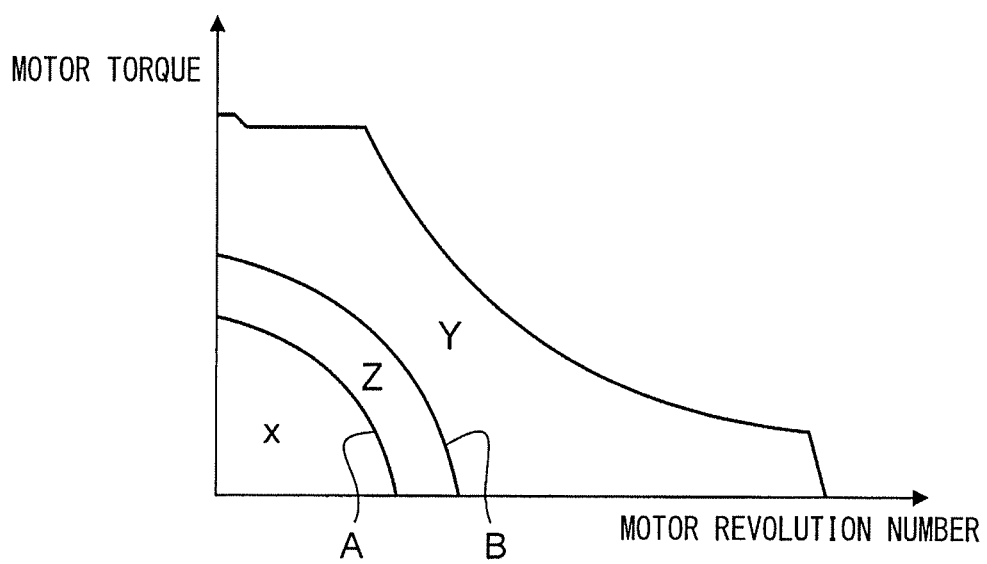
FIG. 4 is a diagram for explaining an example of a determination process performed by a state determination unit.

FIG. 4 is a diagram for explaining a determination process of the state determination unit 220 and illustrates a first driving state X and a second driving state Y. The state determination unit 220 may determine whether the driving state of the vehicle is either one of the first driving state X and the second driving state Y. In an example implementation of the technology, the driving state of the vehicle may be specified on the basis of the motor revolution number and the motor torque. While the motor torque is constant, the motor revolution number in the first driving state X may be smaller than that in the second driving state Y. While the motor revolution number is constant, the motor torque in the first driving state X may be smaller than that in the second driving state Y.

As illustrated in FIG. 4, a third driving state Z may be set between the first driving state X and the second driving state Y. While the motor torque is constant, the motor revolution number in the third driving state Z may be smaller than that in the second driving state Y but be greater than that in the first driving state X. While the motor revolution number is constant, the motor torque in the third driving state Z may be smaller than that in the second driving state Y but be greater than that in the first driving state X.

The state determination unit 220 may determine whether the driving state of the vehicle is either one of the first driving state X and the second driving state Y, on the basis of output from the motor revolution number sensor 212 and output from the motor torque sensor 210. The motor revolution number sensor 212 may output a detected value of the motor revolution number. The motor torque sensor 210 may output a detected value of the motor torque.

The state determination unit 220 may determine the driving state of the vehicle as being the first driving state X when the motor revolution number is a first threshold value A or smaller, and may determine the driving state of the vehicle as being the second driving state Y when the motor revolution number is a second threshold value B or greater. In an example implementation of the technology, as illustrated in FIG. 4, the first threshold value A and the second threshold value B may be variables that vary with the motor torque. The first threshold value A and the second threshold value B may, for example, decrease as the motor torque increases. While the motor torque is constant, the second threshold value B may be greater than the first threshold value A.

Figure 5A:
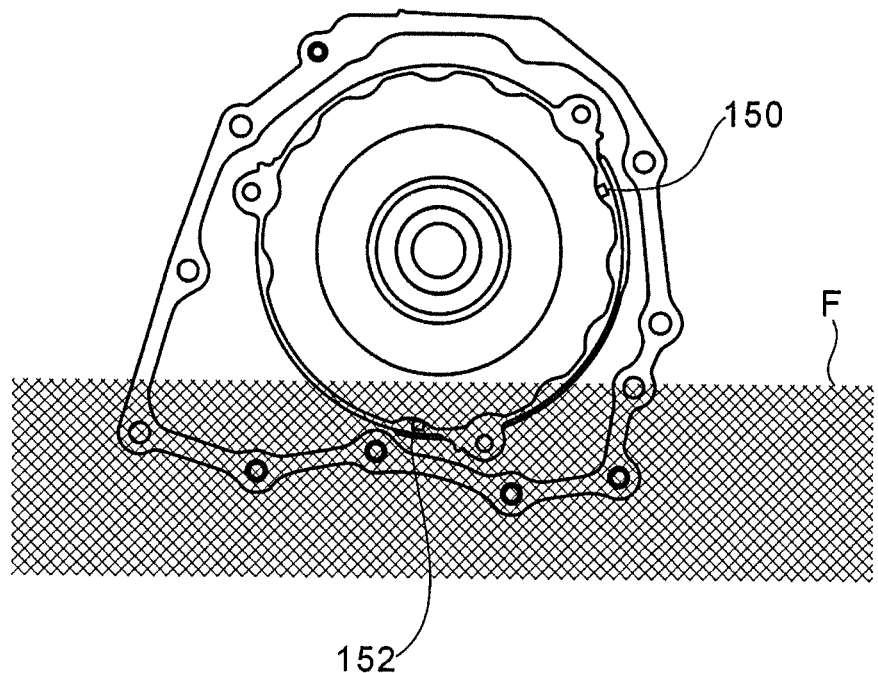
FIGS. 5A and 5B are diagrams for explaining an example of a position relationship between an oil level of oil and a common temperature sensor.
Figure 5B:
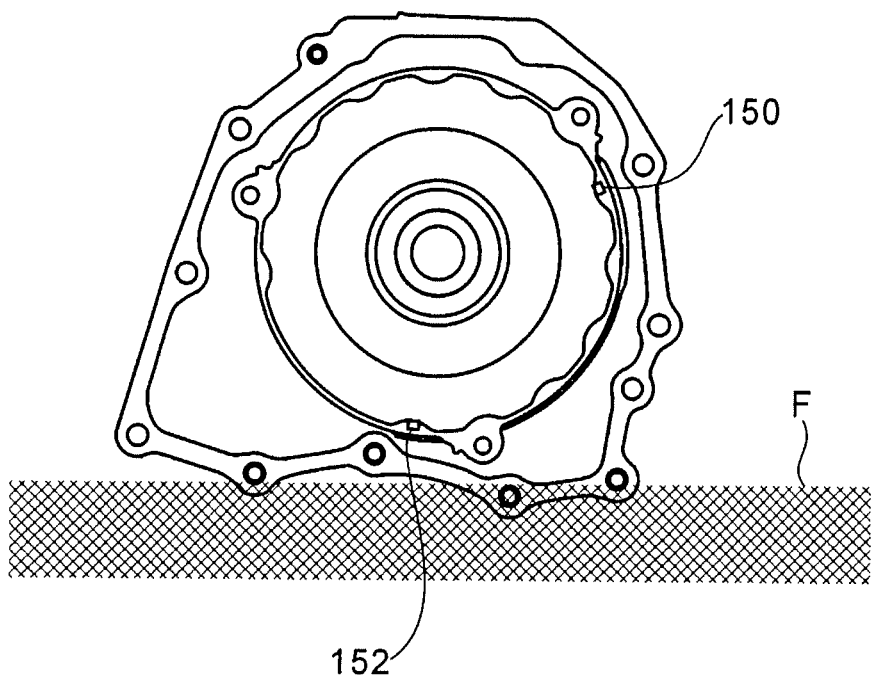

FIGS. 5A and 5B are diagrams for explaining a position relationship between an oil level F of the oil and the common temperature sensor 152. FIG. 5A illustrates the oil level F of the oil in the first driving state X. FIG. 5B illustrates the oil level F of the oil in the second driving state Y.

As illustrated in FIGS. 5A and 5B, the oil level F of the oil may be varied in accordance with the driving state of the vehicle. For example, in a case where the motor revolution number and the motor torque are greater, the oil level F of the oil may fall in accordance with an increase in the amount of the oil supplied to the oil hydraulic circuit and the lubricating circuit. Conversely, in a case where the motor revolution number and the motor torque are smaller, the oil level F of the oil may rise in accordance with a decrease in the amount of the oil supplied to the oil hydraulic circuit and the lubricating circuit.

In an example implementation of the technology, the common temperature sensor 152 may be in a sunken state in the oil in the first driving state X, as illustrated in FIG. 5A. That is, the position of the common temperature sensor 152 may become lower than that of the oil level F in the vertical direction. As illustrated in FIG. 5B, the position of the common temperature sensor 152 may be higher than that of the oil level F of the oil in the vertical direction in the second driving state Y. Thus, the common temperature sensor 152 may exist at either one of the two positions, which are different from each other, depending on the driving state of the vehicle. In other words, the first driving state X and the second driving state Y may be set to enable determination as to whether the position of the oil level F of the oil is higher or lower than that of the common temperature sensor 152.

In contrast, the motor temperature sensor 150 may not be in the sunken state in the oil in the first driving state X. That is, the position of the motor temperature sensor 150 in the vertical direction may be higher than that of the oil level F regardless of the driving state of the vehicle. Thus, the motor temperature sensor 150 may be disposed at the position that is higher than that of the oil level F.

In the third driving state Z, the position of the oil level F of the oil may be closer to the common temperature sensor 152. Therefore, whether the position of the oil level F of the oil is higher or lower than that of the common temperature sensor 152 may not be exactly determined. Compared with a case where the third driving state Z is not set, the accuracy of the determination as to whether the position of the oil level F of the oil is higher or lower than that of the common temperature sensor 152 is improved in a case where the third driving state Z is set.

The malfunction diagnosis unit 222 may perform malfunction diagnosis on the basis of output from the common temperature sensor 152 in the first driving state X and output from the common temperature sensor 152 in the second driving state Y. Each of the output from the common temperature sensor 152 in the first driving state X and the output from the common temperature sensor 152 in the second driving state Y may be a detected value of temperature.

For example, the malfunction diagnosis unit 222 may compare the output from the common temperature sensor 152 in the first driving state X and the output from the oil temperature sensor 154 in the first driving state X with each other. The malfunction diagnosis unit 222 may determine any of the oil temperature sensor 154 and the common temperature sensor 152 as having malfunction when a difference between the output from the common temperature sensor 152 and the output from the oil temperature sensor 154 is a predetermined threshold value or greater.

Further, the malfunction diagnosis unit 222 may compare the output from the common temperature sensor 152 in the second driving state Y and the output from the motor temperature sensor 150 in the second driving state Y with each other. The malfunction diagnosis unit 222 may determine either one of the motor temperature sensor 150 and the common temperature sensor 152 as having malfunction when a difference between the output from the common temperature sensor 152 and the output from the motor temperature sensor 150 is a predetermined threshold value or greater.

As described above, the common temperature sensor 152 that is in the sunken state in the oil may detect the temperature of the oil in the first driving state X. In this case, the output from the common temperature sensor 152 and the output from the oil temperature sensor 154 may be compared with each other to perform the malfunction diagnosis for the common temperature sensor 152 and the oil temperature sensor 154.

Meanwhile, in the second driving state Y, since the position of the common temperature sensor 152 may be higher than that of the oil level F of the oil in the vertical direction, the common temperature sensor 152 may detect the temperature of the motor 100 or the coil 124. In this case, the output from the common temperature sensor 152 and the output from the motor temperature sensor 150 may be compared with each other to perform the malfunction diagnosis for the common temperature sensor 152 and the motor temperature sensor 150.

Upon determining any one of the motor temperature sensor 150, the common temperature sensor 152, and the oil temperature sensor 154 as having malfunction, the malfunction diagnosis unit 222 may notify a driver of the malfunction, for example, by lighting an alarm lamp, for example, in a main panel of a driver seat.

Thus, the vehicle control apparatus 200 may use the common temperature sensor 152 to perform the malfunction diagnosis of both of the motor temperature sensor 150 and the oil temperature sensor 154. Compared with a case of providing a temperature sensor to perform malfunction diagnosis of the motor temperature sensor 150 as well as providing a temperature sensor to perform malfunction diagnosis of the oil temperature sensor 154, the number of the temperature sensors is decreased, thereby enabling a reduction in cost.

In an example implementation of the technology, the driving state of the vehicle may be specified on the basis of the motor revolution number and the motor torque. However, the driving state of the vehicle may be specified on the basis of only the motor revolution number. In this case, the state determination unit 220 may determine the driving state of the vehicle as being the first driving state when the motor revolution number is a first threshold value or smaller, and may determine the driving state of the vehicle as being the second driving state when the motor revolution number is a second threshold value or greater. These first and second threshold values may be constant, and the second threshold value may be greater than the first threshold value. The determination of the driving state of the vehicle based on only the motor revolution number decreases a load of the determination process.

Note that, in the case where the state determination unit 220 determines whether the driving state of the vehicle is either of the first driving state X and the second driving state Y on the basis of the motor torque in addition to the motor revolution number as described above, the accuracy of the determination as to whether the position of the oil level F of the oil is higher or lower than that of the common temperature sensor 152 is improved.

Figure 6:
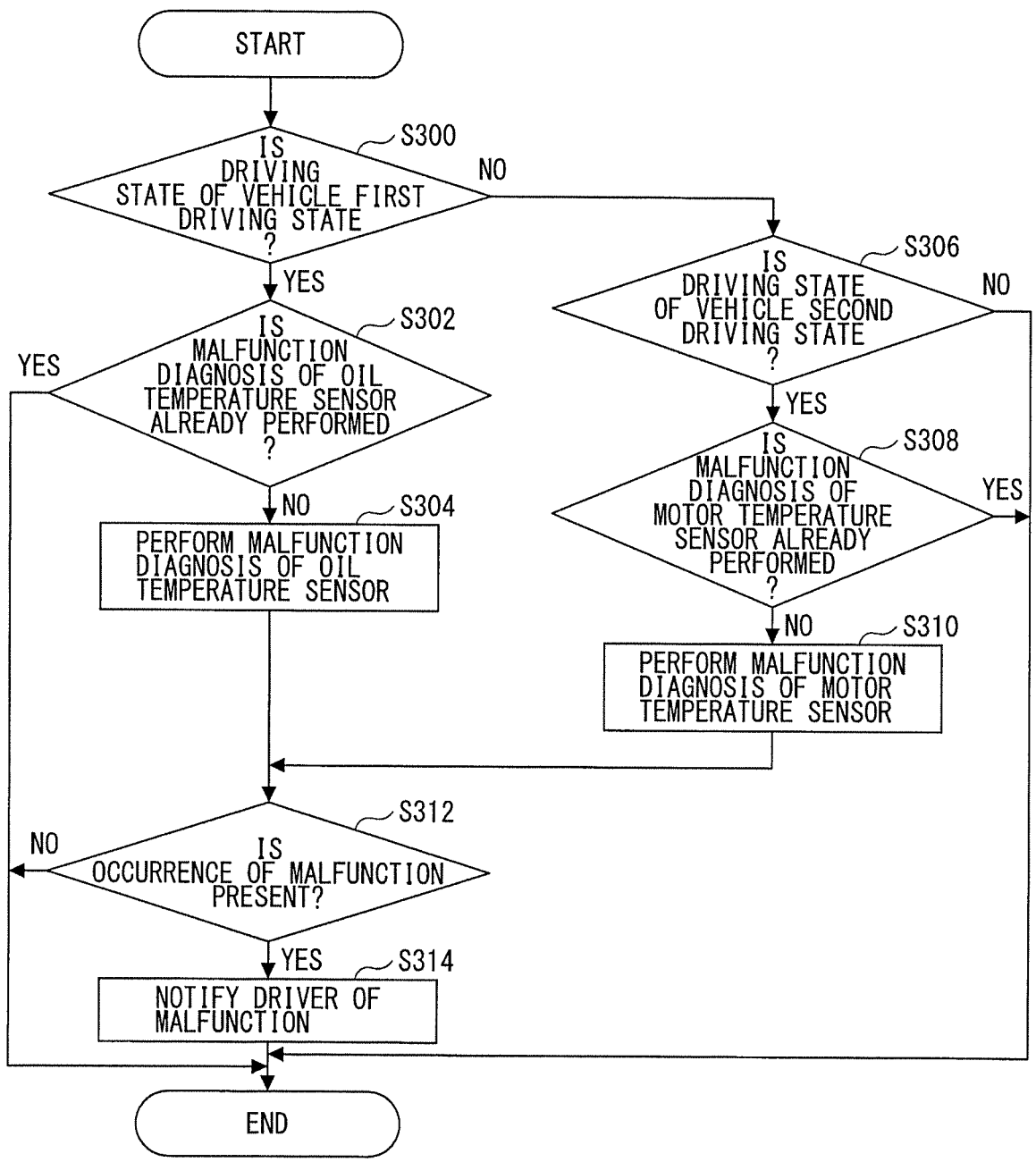
FIG. 6 is a flowchart of an example of a malfunction diagnosis process.

FIG. 6 is a flowchart of an example of a malfunction diagnosis process. For example, the malfunction diagnosis process illustrated in FIG. 6 may be repeatedly executed until each of the malfunction diagnosis of the motor temperature sensor 150 and the malfunction diagnosis of the oil temperature sensor 154 is performed once during one driving period.

The state determination unit 220 may determine whether the driving state of the vehicle is the first driving state X on the basis of the output from the motor torque sensor 210 and the output from the motor revolution number sensor 212. When the driving state of the vehicle is the first driving state X, the process may advance to S302, and when the driving state of the vehicle is not the first driving state X, the process may advance to S306.

The malfunction diagnosis unit 222 may determine whether the malfunction diagnosis of the oil temperature sensor 154 is already performed during the current driving period. When the malfunction diagnosis of the oil temperature sensor 154 is already performed, the malfunction diagnosis process may be brought to an end, and when the malfunction diagnosis of the oil temperature sensor 154 is not performed yet, the process may advance to S304.

The malfunction diagnosis unit 222 may perform the malfunction diagnosis of each of the common temperature sensor 152 and the oil temperature sensor 154 by comparing the output from the common temperature sensor 152 and the output from the oil temperature sensor 154 with each other.

The state determination unit 220 may determine whether the driving state of the vehicle is the second driving state Y on the basis of the output from the motor torque sensor 210 and the output from the motor revolution number sensor 212. When the driving state of the vehicle is the second driving state Y, the process may advance to S308, and when the driving state of the vehicle is not the second driving state Y, the corresponding malfunction diagnosis process may be brought to an end.

The malfunction diagnosis unit 222 may determine whether the malfunction diagnosis of the motor temperature sensor 150 is already performed during the current driving period. When the malfunction diagnosis of the motor temperature sensor 150 is already performed, the malfunction diagnosis process may be brought to an end, and when the malfunction diagnosis of the motor temperature sensor 150 is not performed yet, the process may advance to S310.

The malfunction diagnosis unit 222 may perform the malfunction diagnosis of each of the common temperature sensor 152 and the motor temperature sensor 150 by comparing the output from the common temperature sensor 152 and the output from the motor temperature sensor 150 with each other.

The malfunction diagnosis unit 222 may determine whether occurrence of a malfunction is present, from the result of the malfunction diagnosis. When the occurrence of the malfunction is present, the process may advance to S314, and when the occurrence of the malfunction is not present, the corresponding malfunction diagnosis process may be brought to an end.

The malfunction diagnosis unit 222 may notify the driver of the malfunction by lighting an alarm lamp in a main panel of a driver seat or in any other unit. Thereafter, the malfunction diagnosis unit 222 may bring the malfunction determination to an end.

Figure 7:
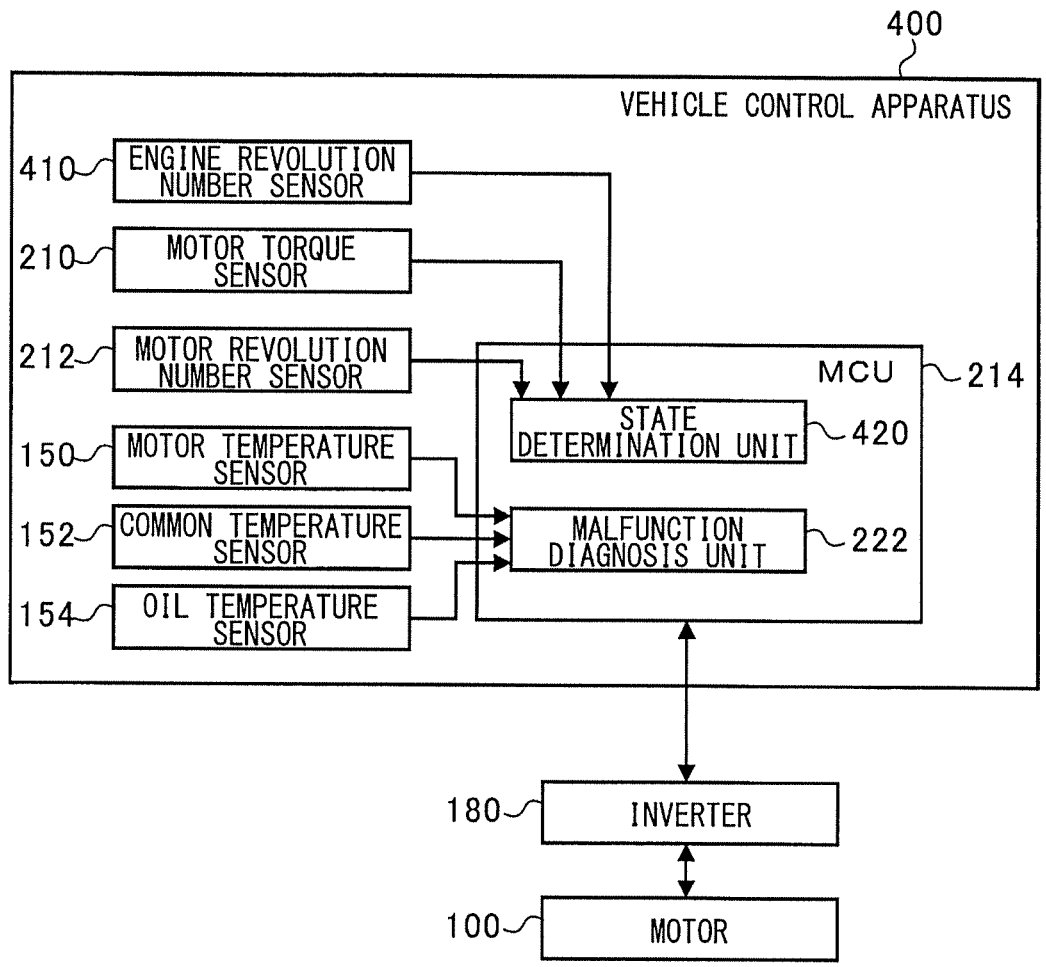
FIG. 7 is a block diagram for explaining an example of functions of a vehicle control apparatus of a modification example.

FIG. 7 is a block diagram for explaining functions of a vehicle control apparatus 400 of a modification example. The vehicle control apparatus 400 may differ from the vehicle control apparatus 200 in the above-described example implementation of the technology, in that the vehicle control apparatus 400 further includes an engine revolution number sensor 410 and a state determination unit 420 to control a vehicle that is further provided with an engine. Other components of the vehicle control apparatus 400 may be the same as those of the vehicle control apparatus 200 in the above-described example implementation of the technology. For this reason, hereinafter, the components that are the same as those of the above-described example implementation of the technology may be represented by the same reference signs, and descriptions thereof are omitted to avoid repetition.

As illustrated in FIG. 7, the vehicle control apparatus 400 may include the engine revolution number sensor 410. The engine revolution number sensor 410 may detect the revolution number of the engine. The revolution number of the engine may be called "engine revolution number" hereinafter. The MCU 214 may serve as the state determination unit 420 and also serve as the malfunction diagnosis unit 222. The state determination unit 420 may determine whether the driving state of the vehicle is either one of the first driving state X and the second driving state Y on the basis of the engine revolution number in addition to the motor revolution number and the motor torque.

The state determination unit 420 may use the engine revolution number in addition to the motor revolution number and the motor torque to determinate the driving state of the vehicle. This improves the accuracy of the determination as to whether the position of the oil level F of the oil is higher or lower than that of the common temperature sensor 152.

Although some example implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, in the above-described example implementation of the technology, the first threshold value A and the second threshold value B may be different from each other. However, the first threshold value A and the second threshold value B may be the same as each other. That is, the third driving state Z may not necessarily be provided.

Figure 8:
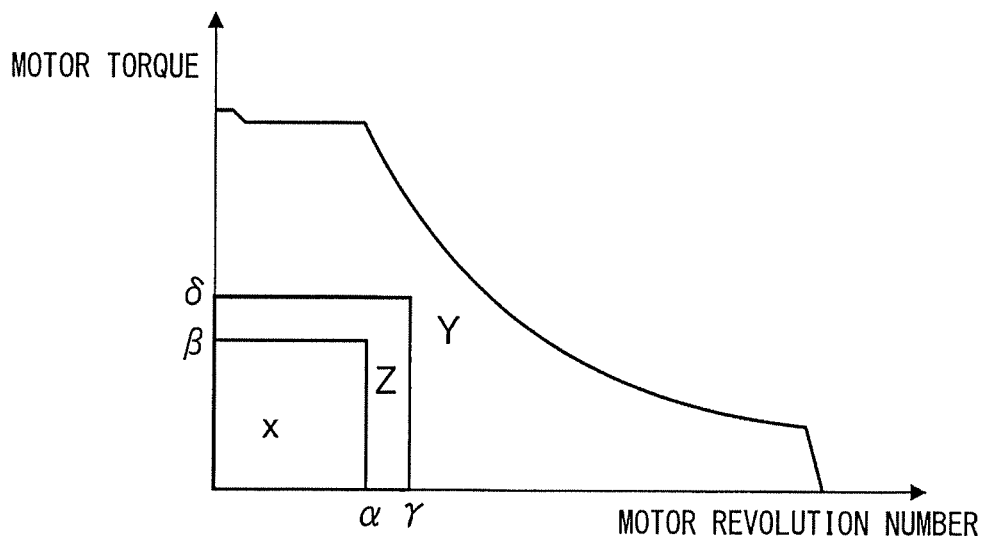
FIG. 8 is a diagram for explaining another example related to the determination process performed by the state determination unit.

In the above-described example implementation of the technology, as illustrated in FIG. 4, the driving state of the vehicle, e.g., the first driving state X and the second driving state Y, may be determined on the basis of the first threshold value A and the second threshold value B, which decrease as the motor torque increases. However, as illustrated in FIG. 8, the driving state of the vehicle may be determined as being the first driving state X when the motor revolution number is a third threshold value α or smaller while the motor torque is a fourth threshold value β or smaller. Also, the driving state of the vehicle may be determined as being the second driving state Y when the motor revolution number is a fifth threshold value γ or greater while the motor torque is a sixth threshold value δ or greater. Each of the third threshold value α, the fourth threshold value β, the fifth threshold value γ, and the sixth threshold value δ may be a constant. The fifth threshold value γ may be greater than the third threshold value α, and the sixth threshold value δ may be greater than the fourth threshold value β. However, the fifth threshold value γ may be the same as the third threshold value α, and the sixth threshold value δ may be the same as the fourth threshold value β. That is, the third driving state Z may not necessarily be provided.

In the above described example implementation of the technology, the motor temperature sensor 150 and the common temperature sensor 152 may be provided to the coil 124 of the motor 100. However, the motor temperature sensor 150 and the common temperature sensor 152 may be provided to any other component such as the motor 100, instead of the coil 124.

In the above-described example implementation of the technology, the oil temperature sensor 154 may be disposed inside the oil pan 160. However, the oil temperature sensor 154 may be disposed at any position in a circulation path of the oil, that is, at any position that is separated away from other heat sources by a predetermined distance to avoid large influence of heat from the other heat sources, where the oil temperature sensor 154 is capable of detecting the temperature of the oil.

According to one implementation of the technology, it is possible to perform malfunction diagnosis of each of the motor temperature sensor and the oil temperature sensor while suppressing cost.

One implementation of the technology may be utilized in a vehicle control apparatus configured to cool a motor mounted on a vehicle.

Each of the MCU 214, the state determination unit 220, and the malfunction diagnosis unit 222 that are illustrated in FIG. 1 and the MCU 214, the state determination unit 420, and the malfunction diagnosis unit 222 that are illustrated in FIG. 4 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the MCU 214, the state determination unit 220, and the malfunction diagnosis unit 222 that are illustrated in FIG. 1 and the MCU 214, the state determination unit 420, and the malfunction diagnosis unit 222 that are illustrated in FIG. 4. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the MCU 214, the state determination unit 220, and the malfunction diagnosis unit 222 that are illustrated in FIG. 1 and the MCU 214, the state determination unit 420, and the malfunction diagnosis unit 222 that are illustrated in FIG. 4.

The invention claimed is:

1. A vehicle control apparatus configured to control a vehicle provided with a motor and oil, the vehicle control apparatus comprising:
    an oil temperature sensor disposed in the oil;
    a motor temperature sensor provided to the motor and disposed at a position that is higher than a position of an oil level of the oil;
    a common temperature sensor provided to the motor, the common temperature sensor being disposed at a position that is in the oil when a driving state of the vehicle is a first driving state and being disposed at a position that is higher than the position of the oil level when the driving state of the vehicle is a second driving state;
    a state determination unit configured to determine whether the driving state of the vehicle is either one of the first driving state and the second driving state, on a basis of at least a revolution number of the motor; and
    a malfunction diagnosis unit configured to perform malfunction diagnosis of the oil temperature sensor on a basis of output from the common temperature sensor in the first driving state and perform malfunction diagnosis of the motor temperature sensor on a basis of output from the common temperature sensor in the second driving state.

2. The vehicle control apparatus according to claim 1, wherein the state determination unit is configured to determine the driving state of the vehicle as being the first driving state when the revolution number of the motor is a first threshold value or smaller and determine the driving state of the vehicle as being the second driving state when the revolution number of the motor is a second threshold value or greater, the second threshold value being greater than the first threshold value.

3. The vehicle control apparatus according to claim 1, wherein the state determination unit is configured to determine whether the driving state of the vehicle is either one of the first driving state and the second driving state, on a basis of torque of the motor in addition to the revolution number of the motor.

4. The vehicle control apparatus according to claim 2, wherein the state determination unit is configured to determine whether the driving state of the vehicle is either one of the first driving state and the second driving state, on a basis of torque of the motor in addition to the revolution number of the motor.

5. The vehicle control apparatus according to claim 3, wherein
the vehicle is further provided with an engine, and
the state determination unit is configured to determine whether the driving state of the vehicle is either one of the first driving state and the second driving state, on a basis of a revolution number of the engine in addition to the revolution number of the motor and the torque of the motor.

6. The vehicle control apparatus according to claim 4, wherein
the vehicle is further provided with an engine, and
the state determination unit is configured to determine whether the driving state of the vehicle is either one of the first driving state and the second driving state, on a basis of a revolution number of the engine in addition to the revolution number of the motor and the torque of the motor.

7. A vehicle control apparatus configured to control a vehicle provided with a motor and oil, the vehicle control apparatus comprising:
an oil temperature sensor disposed in the oil;
a motor temperature sensor provided to the motor and disposed at a position that is higher than a position of an oil level of the oil;
a common temperature sensor provided to the motor, the common temperature sensor being disposed at a position that is in the oil when a driving state of the vehicle is a first driving state and being disposed at a position that is higher than the position of the oil level when the driving state of the vehicle is a second driving state; and
circuitry configured to
determine whether the driving state of the vehicle is either one of the first driving state and the second driving state, on a basis of at least a revolution number of the motor, perform malfunction diagnosis of the oil temperature sensor on a basis of output from the common temperature sensor in the first driving state and
perform malfunction diagnosis of the motor temperature sensor on a basis of output from the common temperature sensor in the second driving state.

\* \* \* \* \*